(12) United States Patent
Sekine

(10) Patent No.: US 8,564,771 B2
(45) Date of Patent: Oct. 22, 2013

(54) CALIBRATION APPARATUS AND CALIBRATION METHOD

(75) Inventor: Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 12/956,910

(22) Filed: Nov. 30, 2010

(65) Prior Publication Data

US 2011/0128542 A1 Jun. 2, 2011

(30) Foreign Application Priority Data

Dec. 1, 2009 (JP) ................................. 2009-273888

(51) Int. Cl.
*G01J 3/28* (2006.01)
(52) U.S. Cl.
USPC .......................................................... 356/326
(58) Field of Classification Search
USPC .................................................. 356/326, 328
See application file for complete search history.

(56) References Cited

U.S. PATENT DOCUMENTS 6,876,448 B2 * 4/2005 Imura et al. .................... 356/326
7,471,391 B2 * 12/2008 Imura ............................. 356/326
7,839,502 B2 * 11/2010 Lukas et al. ................... 356/326
2004/0170215 A1 * 9/2004 Rossi et al. .................... 374/183
2005/0267689 A1 * 12/2005 Tsypin ............................. 702/19
2009/0002703 A1 * 1/2009 Parman ........................ 356/326

FOREIGN PATENT DOCUMENTS

JP 2689707 B2 4/1992

* cited by examiner

*Primary Examiner* — Gregory J Toatley
*Assistant Examiner* — Shawn Decenzo
(74) *Attorney, Agent, or Firm* — Canon U.S.A., Inc., IP Division

(57) ABSTRACT

A calibration apparatus associates a pixel position and a wavelength of a spectrometer sensor. In calibrating the sensor, the calibration apparatus searches for a first pixel value corresponding to a bright line spectrum of incident light by a first search method based on the pixel value corresponding to the incident light acquired by the sensor and searches for a second pixel value corresponding to the bright line spectrum of the incident light by a second search method based on the pixel value corresponding to the incident light acquired by the sensor. The calibration apparatus associates either one of a first pixel position and a second pixel position with the wavelength of the bright line spectrum of the incident light. The calibration apparatus can appropriately acquire a correspondence relation between a detection position and a wavelength even if the correspondence relation has varied due to aging or changes in the temperature.

15 Claims, 11 Drawing Sheets

FIG. 4A

| NUMBER OF SEARCH TARGET EXTREMAL VALUES | 3 | ~401 |
|---|---|---|
| EXTREMAL VALUE WAVELENGTH (1) | 451mm | ~402 |
| EXTREMAL VALUE WAVELENGTH (2) | 506mm | ~403 |
| EXTREMAL VALUE WAVELENGTH (3) | 563mm | ~404 |
| NUMBER OF DIMENSIONS FOR FITTING | 2 | ~405 |
| THRESHOLD FOR DETERMINING FITTING STATUS | 100 | ~406 |

FIG. 4B

| | EXTREMAL VALUE (1) | | EXTREMAL VALUE (2) | | EXTREMAL VALUE (3) | | |
|---|---|---|---|---|---|---|---|
| | LEFTMOST PIXEL | RIGHTMOST PIXEL | LEFTMOST PIXEL | RIGHTMOST PIXEL | LEFTMOST PIXEL | RIGHTMOST PIXEL | |
| SEARCH RANGE 1 | 32 | 36 | 50 | 54 | 68 | 72 | ~407 |
| SEARCH RANGE 2 | 28 | 32 | 45 | 49 | 63 | 67 | ~408 |
| SEARCH RANGE 3 | 37 | 41 | 55 | 59 | 73 | 77 | ~409 |
| SEARCH RANGE 4 | 28 | 41 | 45 | 59 | 63 | 77 | ~410 |

FIG. 4C

| | EXTREMAL VALUE (1) | | | EXTREMAL VALUE (2) | | | EXTREMAL VALUE (3) | | |
|---|---|---|---|---|---|---|---|---|---|
| | LEFTMOST PIXEL | RIGHTMOST PIXEL | NUMBER OF DIMENSIONS FOR FITTING | LEFTMOST PIXEL | RIGHTMOST PIXEL | NUMBER OF DIMENSIONS FOR FITTING | LEFTMOST PIXEL | RIGHTMOST PIXEL | NUMBER OF DIMENSIONS FOR FITTING |
| SEARCH PARAMETER 1 | 32 | 36 | 2 | 50 | 54 | 2 | 68 | 72 | 2 |
| SEARCH PARAMETER 2 | 28 | 31 | 2 | 50 | 54 | 2 | 63 | 67 | 2 |
| SEARCH PARAMETER 3 | 37 | 41 | 2 | 55 | 59 | 2 | 73 | 77 | 2 |
| SEARCH PARAMETER 4 | 32 | 36 | 2 | 45 | 59 | 3 | 68 | 72 | 2 |
| SEARCH PARAMETER 5 | 28 | 31 | 2 | 55 | 59 | 2 | 63 | 77 | 3 |

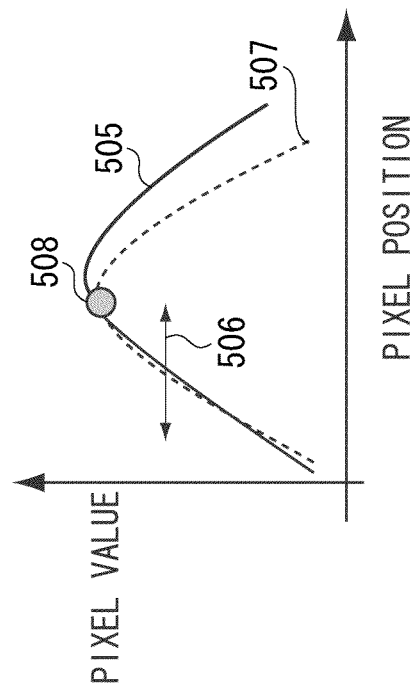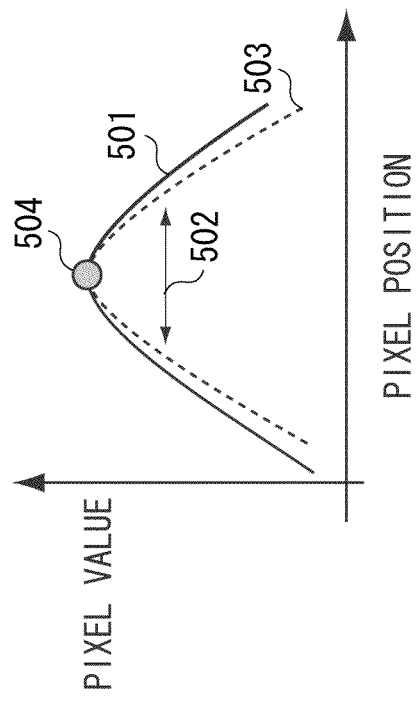

FIG. 9

| NUMBER OF SEARCH TARGET EXTREMAL VALUES | 3 | ~901 |
|---|---|---|
| EXTREMAL VALUE WAVELENGTH (1) | 451mm | ~902 |
| EXTREMAL VALUE WAVELENGTH (2) | 506mm | ~903 |
| EXTREMAL VALUE WAVELENGTH (3) | 563mm | ~904 |

| | EXTREMAL VALUE (1) | | | EXTREMAL VALUE (2) | | | EXTREMAL VALUE (3) | | | |
|---|---|---|---|---|---|---|---|---|---|---|
| | LEFTMOST PIXEL | RIGHTMOST PIXEL | NUMBER OF DIMENSIONS FOR FITTING | LEFTMOST PIXEL | RIGHTMOST PIXEL | NUMBER OF DIMENSIONS FOR FITTING | LEFTMOST PIXEL | RIGHTMOST PIXEL | NUMBER OF DIMENSIONS FOR FITTING | |
| 20°C | 32 | 36 | 2 | 50 | 54 | 2 | 68 | 72 | 2 | ~905 |
| 30°C | 28 | 31 | 2 | 50 | 54 | 2 | 63 | 67 | 2 | ~906 |
| 40°C | 37 | 41 | 2 | 55 | 59 | 2 | 73 | 77 | 2 | ~907 |
| 50°C | 32 | 36 | 2 | 45 | 59 | 3 | 68 | 72 | 2 | ~908 |
| 60°C | 28 | 31 | 2 | 55 | 59 | 2 | 63 | 77 | 3 | ~909 |

CALIBRATION APPARATUS AND CALIBRATION METHOD

BACKGROUND OF THE INVENTION

1. Field of the Invention

The present invention relates to a calibration apparatus and a calibration method configured to calibrate a spectrometer according to a correspondence relation between a pixel position and a wavelength corresponding to a bright line spectrum of a sensor.

2. Description of the Related Art

FIG. 10 illustrates an example of a Rowland spectrometer including a combination of a concave diffraction grating and a light-receiving sensor (a line sensor). Referring to FIG. 10, a sample is irradiated with light from a light source. Reflection light from the sample is incident to the spectrometer via a slit. Then, the light incident to the concave diffraction grating is dispersed and reflected. Further, the reflected light is formed on the concave diffraction grating as an image on a circle whose diameter is equivalent to a radius of curvature. Spectral information about the incident light can be measured according to an intensity of the spectral light acquired as a pixel value by a line sensor, which is provided at an image forming position. If a spectrometer having the above-described configuration is used, the spectral information cannot be measured at a high accuracy unless the correspondence relation between the wavelength of the incident light and a pixel position on the line sensor is accurately calculated.

In the spectrometer having the above-described configuration, the correspondence relation between the pixel position and the wavelength becomes nonlinear due to the following two characteristics. More specifically, firstly, an image of optically dispersed light is formed along a circumference but the line sensor generally has a flat surface. Accordingly, the position at which an image has been intended to be formed and the position on the line sensor may become different from each other. Secondly, the dispersed light may be defocused due to the optical characteristic of the concave diffraction grating. In addition, the defocus characteristic may differ according to the wavelength.

In order to calculate the nonlinear correspondence relation between the pixel position and the wavelength, a method is generally used in which a single wavelength is caused to enter the spectrometer and the correspondence relation is calculated for each pixel using a monochromator. However, it is not practical to assemble a spectrometer having a monochromator into an apparatus such as a printer.

Japanese Registered Patent No. 2689707 discusses the following simple calibration method. More specifically, in this conventional method, light emitted from a light source having a plurality of bright line spectra is caused to enter a spectrometer. Further, the wavelength of the bright line spectrum and a corresponding detection position is calculated. Moreover, a regression curve is generated based on a combination of the wavelengths of the plurality of bright line spectra and the corresponding detection positions. Thus, the conventional method calculates the correspondence relation between the pixel position and the wavelength. Hereinbelow, a "detection position" refers to a pixel position on a sensor that corresponds to a specific bright line spectrum.

If the method discussed in the Japanese Registered Patent No. 2689707 is used, in order to calculate the correspondence relation between the pixel position and the wavelength, it becomes necessary to previously specify the range of the detection positions at which an image of a bright line spectrum is formed. However, in a spectrometer, the wavelength and the detection position on the sensor may vary due to aging of the spectrometer or changes in the temperature inside the spectrometer. Accordingly, the correspondence relation between the detection position and the wavelength may not always be appropriately acquired within a previously specified range. As a result, the spectrometer may not be accurately calibrated.

SUMMARY OF THE INVENTION

According to an aspect of the present invention, a calibration apparatus configured to associate a pixel position and a wavelength of a sensor included in a spectrometer and to calibrate the spectrometer according to the mutually associated pixel position and the wavelength includes a first search unit configured, based on a pixel value corresponding to incident light acquired by the sensor of the spectrometer, to search for a first pixel position corresponding to a bright line spectrum of the incident light by using a first search method, a second search unit configured, based on the pixel value corresponding to incident light acquired by the sensor of the spectrometer, to search for a second pixel position corresponding to the bright line spectrum of the incident light by using a second search method, and an association unit configured to associate either one of the first pixel position, which has been extracted by the first search unit, and the second pixel position, which has been extracted by the second search unit, with the wavelength of the bright line spectrum of the incident light.

Further features and aspects of the present invention will become apparent from the following detailed description of exemplary embodiments with reference to the attached drawings.

BRIEF DESCRIPTION OF THE DRAWINGS

The accompanying drawings are incorporated in and constitute a part of the specification, and illustrate various exemplary embodiments, features, and aspects of the present invention.

FIGS. 4A through 4C illustrate an example of parameters according to the first exemplary embodiment of the present invention.

FIGS. 5A and 5B illustrate an example of processing for determining an extremal value according to the first exemplary embodiment of the present invention.

FIG. 9 illustrates an example of parameters according to the second exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention will be described below. At first, the present exemplary embodiment acquires a distribution of pixel values (a distribution in which pixel positions are set as inputs while pixel values are set as outputs) which is data of measurement on a reference white plate. Then, the present exemplary embodiment approximates the acquired pixel value distribution by an n-th order polynomial within a search range. Further, the present exemplary embodiment searches for an extremal value (i.e., calculates a vertex) of the approximated n-th order polynomial. In addition, the present exemplary embodiment determines whether the searched extremal value satisfies a predetermined condition. If it is determined that the searched extremal value satisfies the predetermined condition, the present exemplary embodiment changes a parameter used in the search (i.e., a search range and the order of dimension of the n-th order polynomial) and executes a re-search using the changed parameter. Thus, the present exemplary embodiment can calculate a correct extremal value. In the present exemplary embodiment, the method used in the first search is referred to as a "first search method". On the other hand, the method used in the re-search that uses the changed parameter is referred to as a "second search method".

Figure 1:
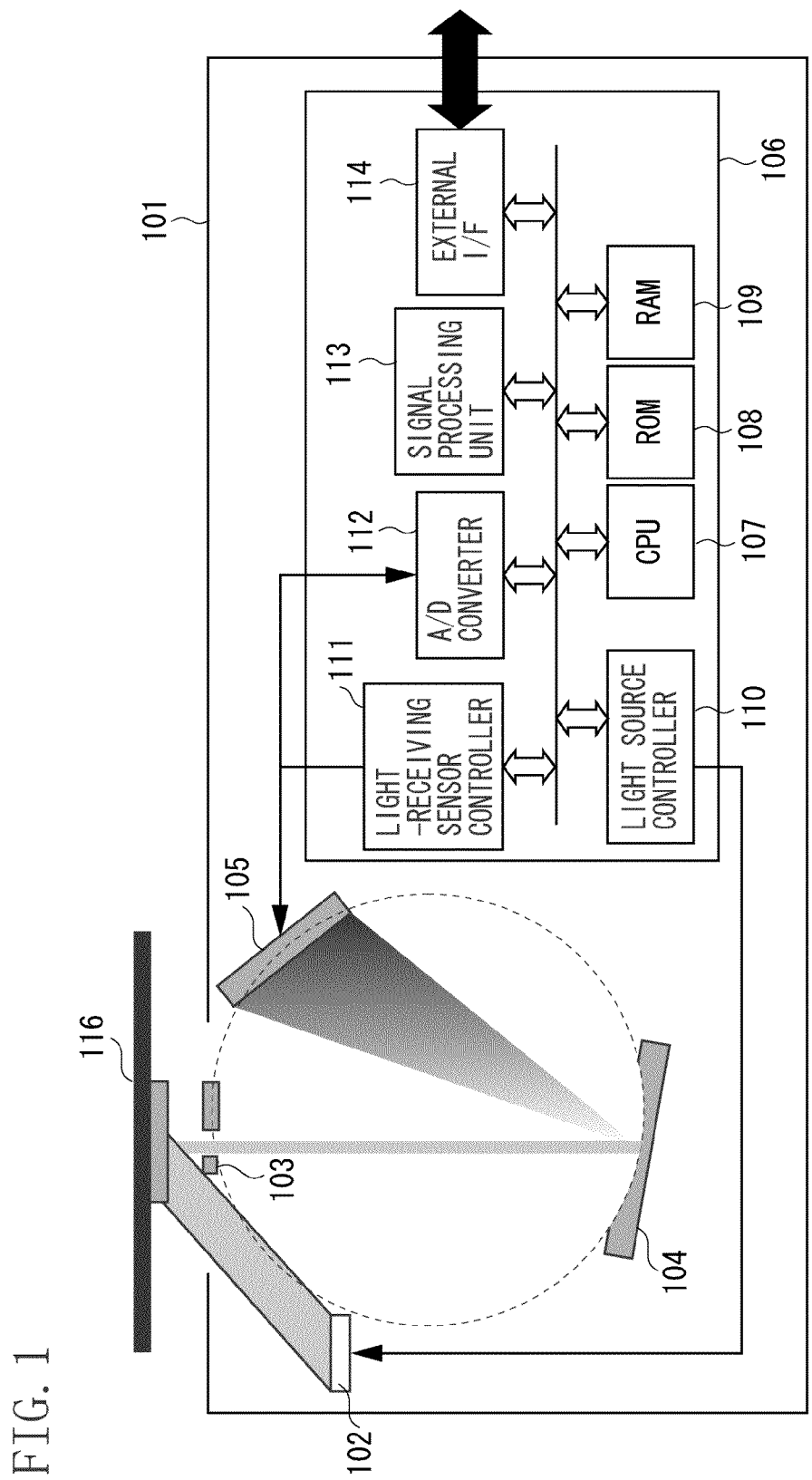
FIG. 1 is a block diagram illustrating an exemplary configuration of a spectrometer according to a first exemplary embodiment and a second exemplary embodiment of the present invention.

An exemplary configuration of a spectrometer 101 according to the present exemplary embodiment will be described in detail below with reference to a block diagram in FIG. 1. Referring to FIG. 1, light emitted from a light source 102 is reflected on a sample 116. The light width of the reflection light is restricted by a slit 103. Then, the reflection light enters the spectrometer 101 as incident light. The slit 103 is included in the spectrometer 101 as a part thereof. A concave diffraction grating 104 disperses and reflects the light incident thereto from the slit 103. A light-receiving sensor 105 (line sensor 105) receives the light dispersed and reflected by the concave diffraction grating 104. A control processing unit 106 controls an operation of the light source 102 and the light-receiving sensor 105. In addition, the control processing unit 106 reads spectral data received by the light-receiving sensor 105. A central processing unit (CPU) 107 controls each unit included in the control processing unit 106. A read-only memory (ROM) 108 is a storage unit that stores a program and a parameter that do not need to be changed. A random access memory (RAM) 109 temporarily stores a program and data supplied from an external apparatus. In addition, the RAM 109 functions as a work memory necessary for executing various control operations and calculations. A light source controller 110 controls an amount, a light emission timing, and light emission time length of light emitted by the light source 102. A light-receiving sensor controller 111 controls the light-receiving sensor 105. An analog-to-digital (A/D) converter 112 converts an analog signal value which is acquired (captured and received) from the light-receiving sensor 105 using the light-receiving sensor controller 111 into a digital signal value. A signal processing unit 113 executes various processing on the digital signal value converted by the A/D converter 112. An external interface (I/F) 114 outputs the digital signal value processed by the signal processing unit 113 to an external apparatus. In addition, the external I/F 114 inputs a control signal from an external apparatus. Each unit of the control processing unit 106 can execute data communication via a system bus 115. In executing processing for calibrating the sensor, a reference white plate is used as the sample 116.

<Flow of Entire Processing>

Figure 2:
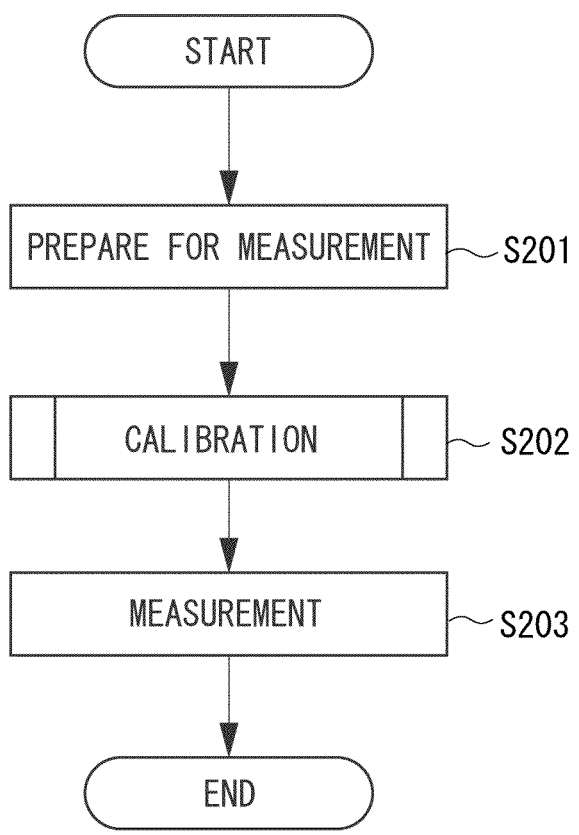
FIG. 2 is a flow chart illustrating an example of the entire processing according to the first and the second exemplary embodiments of the present invention.
Figure 3:
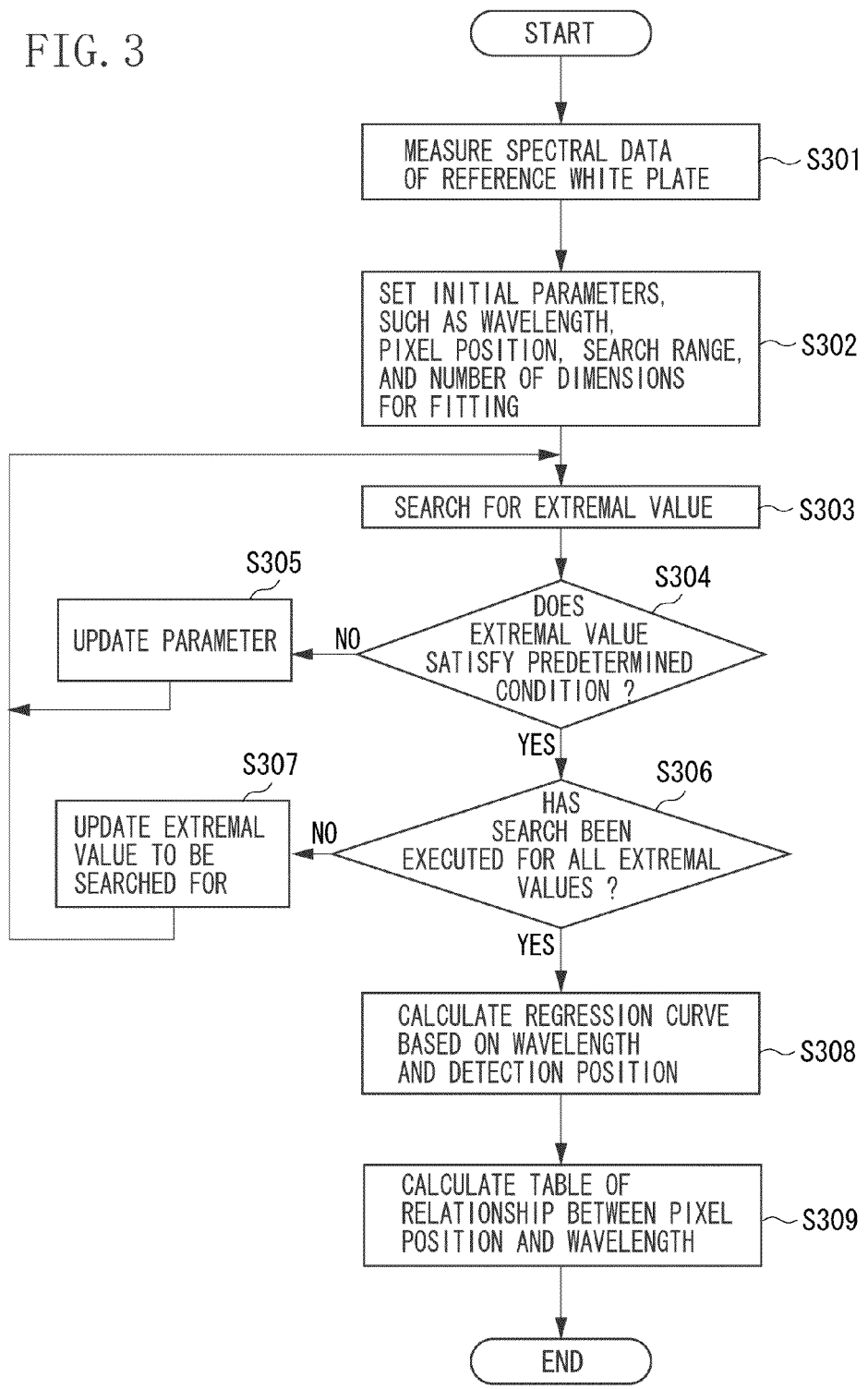
FIG. 3 is a flow chart illustrating an exemplary flow of calibration processing according to the first exemplary embodiment of the present invention.

An exemplary flow of the entire processing executed by using the spectrometer 101 according to the present exemplary embodiment will be described in detail below with reference to flow charts of FIGS. 2 and 3. Referring to FIG. 2, in step S201, a user powers on the spectrometer 101 to prepare for measurement. In step S202, the user executes calibration of the spectrometer 101. The processing for calibrating the spectrometer 101 will be described in detail below. In step S203, target spectral data is measured by the calibrated spectrometer 101.

<Calibration>

The calibration in step S202 will be described in detail below with reference to FIG. 3. Referring to FIG. 3, in step S301, the CPU 107 drives the light source controller 110 and lights the light source 102. In addition, the CPU 107 drives the light-receiving sensor controller 111 and measures spectral data of the reference white plate 116. The A/D converter 112 and the signal processing unit 113 convert the measurement data into digital data so that the data can be easily subjected to various processing, which will be described below. The converted digital data is stored on the RAM 109. In step S302, the CPU 107 reads, from the ROM 108, initial parameters, such as a correspondence relation between a wavelength and a detection position, a search range, and the number of fitting dimensions (i.e., the number of dimensions of an n-th order polynomial). The initial parameters will be described in detail below. The read initial parameters are stored on the RAM 109. In step S303, the CPU 107 searches for an extremal value of a distribution of pixel values (a detection position corresponding to the extremal value) according to the initial parameters read in step S302 within the search range (a search for a detection position according to a first search method, which will be described in detail below). In step S304, the CPU 107 determines whether the extremal value extracted in step S303 satisfies a predetermined condition. The determination in step S304 will be described in detail below. If it is determined that the extremal value extracted in step S303 satisfies the predetermined condition (Yes in step S304), then the CPU 107 stores the correspondence relation between the detection position and the wavelength corresponding to the extracted extremal value on the RAM 109. Then the processing advances to step S306. On the other hand, if it is determined that the extremal value extracted in step S303 does not satisfy the predetermined condition (No in step S304), then the processing advances to step S305. In step S305, the CPU 107 reads a next candidate parameter from the ROM 108 and stores the read candidate parameter on the RAM 109. Then, the processing returns to step S303. Processing for updating the parameter will be described in detail below. In step S303, the CPU 107 re-searches an extremal value (and a detection position corresponding to the extremal value) based on the updated parameter (i.e., executes a search for a detection position by using a second search method). Then, the CPU 107 continues to execute the processing in steps S304 and beyond.

In step S306, the CPU 107 determines whether the search has been completely executed for all extremal values. If it is determined that the search has been completely executed for all extremal values (Yes in step S306), then the processing advances to step S308. On the other hand, if not (No in step S306), the processing advances to step S307. In step S307, the CPU 107 updates the extremal value to be searched for. Then the processing returns to step S303. Then, the CPU 107 repeats the processing in steps S303 through S307 to acquire a detection position for each of all the extremal values. In step S308, the CPU 107 calculates a regression curve based on the correspondence relation between the wavelength and the detection position corresponding to the extremal value acquired in steps S303 through S307. The regression curve indicates the correspondence relation between the wavelength and the detection position on the line sensor 105. In step S309, the CPU 107 generates an association table that stores the pixel position and the wavelength based on the regression curve calculated in step S308. Further, the CPU 107 stores the generated association table on the RAM 109. By using the regression curve, the wavelength at a pixel position other than the detection position can be estimated. The present exemplary embodiment calibrates the spectrometer 101 according to the association table stored on the RAM 109.

<Parameter>

FIGS. 4A and 4B illustrate an example of parameters according to the present exemplary embodiment. The parameters illustrated in FIGS. 4A and 4B are stored on the ROM 108 and the RAM 109. In the present exemplary embodiment, the following parameters are necessary. The total number of search target extremal values (a field 401 in FIG. 4A) The wavelength of the search target extremal value in the initial state (fields 402 through 404 in FIG. 4A) The initial number of dimensions for fitting in the n-th order polynomial used for calculating the extremal value (a field 405 in FIG. 4A) A threshold used for determining the fitting status (a field 406 in FIG. 4A) The search range for searching for each extremal value (fields 407 through 410 in FIG. 4A) The wavelength of the extremal value corresponding to the wavelength of the bright line spectrum of the incident light. If the extremal value is calculated by a multiple regression analysis by executing an approximation by an n-th order polynomial, pixels of the number of pixels of at least (the number of dimensions for fitting+1) become necessary. An output of a light-receiving sensor generally includes noise. Accordingly, if a high number of dimensions for fitting is set, the fitting for the variation of noise may occur. As a result, an incorrect extremal value may be calculated. Therefore, it is useful to use a number of dimensions for fitting as small as possible.

<Search for Extremal Value>

Now, a method for searching for the extremal value in step S303 will be described in detail below. Suppose that the extremal values are approximated by a two-dimensional polynomial. Further, let "x0", "x1", "x2", and so on be a detection position within the search range, "y0", "y1", "y2", and so on be an output value (pixel value) acquired as a result of the measurement of the corresponding reference white plate 116, and "a", "b", and "c" be coefficients of the two-dimensional polynomial, then the coefficients "a", "b", and "c" can be calculated by using the following expression 1 by using the method of least square:

$$Y = [\begin{array}{cccc} y_0 & y_1 & y_2 & \dots \end{array}] \quad (1)$$

$$X = \begin{bmatrix} x_0^2 & x_1^2 & x_2^2 & \dots \\ x_0 & x_1 & x_2 & \dots \\ 1 & 1 & 1 & \dots \end{bmatrix}$$

$$[\begin{array}{ccc} a & b & c \end{array}] = Y X^T (X X^T)^{-1}$$

T: transpose of a matrix
−1: inverse matrix

The detection position at which the extremal value is to be searched for (an extremal value position) is calculated using the following expression 2 by using the coefficients a, b, and c, which have been calculated from the above-described expression 1:

$$\text{Extremal value position} = -b/2a \quad (2)$$

The extremal value is geometrically and algebraically calculated for a three-dimensional polynomial or higher.

<Determination of Extremal Value>

The determination of the extremal value in step S304 will be described in detail below with reference to FIGS. 5A and 5B and 6A and 6B.

FIG. 5A illustrates a case where the extremal value has been appropriately extracted. Referring to FIG. 5A, a polynomial approximation 503 is executed on measurement value of the reference white plate 501 within a search range 502. Further, an extremal value position 504 is calculated by the above-described method. In the example illustrated in FIG. 5A, the extremal value of the measurement values of the reference white plate and the extremal value position 504 which has been calculated by the polynomial approximation match each other (or have a mere difference within tolerance). On the other hand, FIG. 5B illustrates a case where the extremal value has been inappropriately extracted. In this case, in the similar manner as described above, an extremal value position 508 is calculated by executing a polynomial approximation 507 on reference white plate measurement values 505 within a search range 506. In the example illustrated in FIG. 5B, the extremal value of the reference white plate measurement value 505 does not match the extremal value position 508 which has been calculated by the polynomial approximation. This is because the search range 506 is not appropriate. For the determination, it is determined whether the calculated extremal value positions 504 or 508 exists within the search range 502 or 506. To paraphrase this, if the extremal value position exists within the search range, it is determined that the extremal value is appropriate. On the other hand, if the extremal value position exists on a boundary between search ranges or outside the search range, it is determined that the extremal value is inappropriate.

Figure 6A:
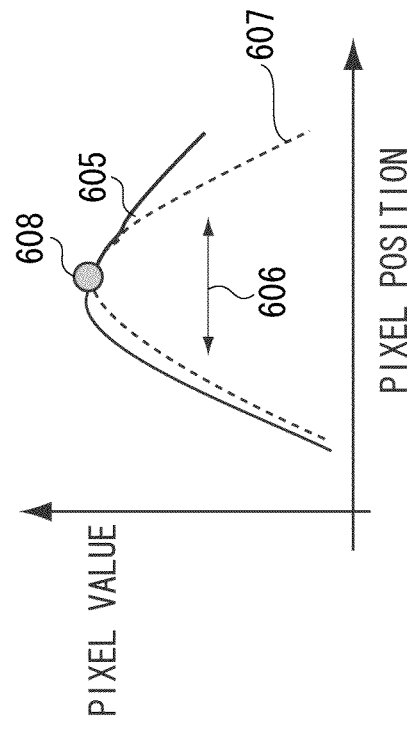
FIGS. 6A and 6B illustrate an example of processing for determining an extremal value according to the first exemplary embodiment of the present invention.
Figure 6B:
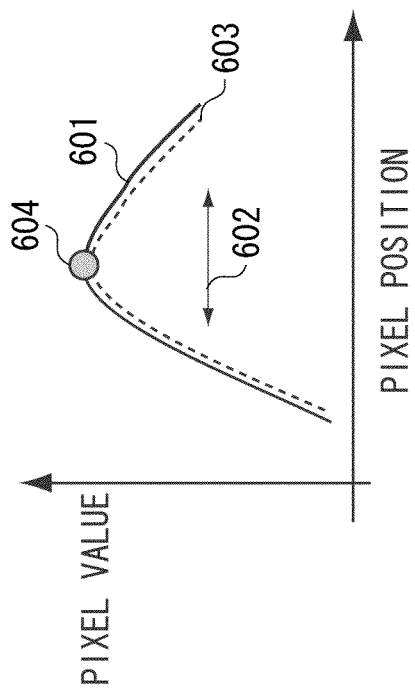

FIG. 6A illustrates another case where an appropriate extremal value is extracted. In the example illustrated in FIG. 6A, an extremal value position 604 is calculated by executing a polynomial approximation 603 on reference white plate measurement value 601 within a search range 602 by the above-described method. In this case, the extremal value of the reference white plate measurement value and the extremal value position 604 which has been calculated by the polynomial approximation match each other (or have a mere difference within tolerance). On the other hand, FIG. 6B illustrates a case where an inappropriate extremal value is extracted. In this case, in the similar manner as described above, an extremal value position 608 is calculated by executing a polynomial approximation 607 on measurement values of the reference white plate 605 within a search range 606. In the example illustrated in FIG. 6B, the extremal value of the reference white plate measurement value 605 does not match the extremal value position 608 which has been calculated by the polynomial approximation. This is because the search is inappropriately executed when the extremal value exists within the above-described search range. In this case, the search has failed because the numbers of dimensions for fitting in the polynomial approximation are different for the subject of the approximation has an asymmetrical shape. In the present exemplary embodiment, it is determined whether an extremal value is appropriate by the following expression 3. More specifically, by the following expression 3, the present exemplary embodiment calculates an error value between the result of the polynomial approximation and the reference white plate measurement value by the least square method. Further, the present exemplary embodiment compares the calculated error value with the threshold 406 (the predetermined value 406) for fitting. In the present exemplary embodiment, if a least square method error value ERRrms is equal to or higher than the threshold 406, then it is determined that the extremal value is inappropriate.

$$ERR_{rms} = \sqrt{\sum_{i=0}^{n} \frac{(y_i - s(x_i))^2}{n-1}} \quad (3)$$

$y_i$: i-th measurement value
$x_i$: i-th pixel number
$s(x) = a_n x^n + a_{n-1} x^{n-1} + \ldots a_1 x + a_0$: result of polynomial approximation Now, the processing for updating the parameter in step S305 will be described in detail below.

The extremal value may be determined inappropriate (determined to satisfy the predetermined condition) in step S304 in the above-described manner because of the following two reasons:

(a) because the extremal value exists on a boundary between search ranges, around the boundary, or outside the search range
(b) because the number of dimensions for fitting used in the polynomial approximation is inappropriate (e.g., because the least square method error value ERRrms in the expression 3 is equal to or higher than the fitting determination threshold 406).

In the following description, processing for updating the parameter, which is executed in the above-described two cases or a case where the above-described two reasons may arise in combination, will be described in detail below.

(a) Updating of Search Range

If the extremal value has been determined inappropriate because the extremal value exists on the boundary between the search ranges or outside the search range, then the present exemplary embodiment shifts (changes) the search range as illustrated in the fields 408 through 410 illustrated in FIG. 4B. In the example illustrated in FIG. 4B, if an appropriate extremal value has not been extracted from a search range 1 (corresponding to the field 407 illustrated in FIG. 4B), the present exemplary embodiment shifts the search range leftwards by a range equivalent to four pixels to a search range 2 (corresponding to the field 408 illustrated in FIG. 4B). If an appropriate extremal value is not extracted in this state yet, the present exemplary embodiment shifts the search range rightwards to a search range 3 (corresponding to the field 409 illustrated in FIG. 4B). Furthermore, if an appropriate extremal value is not extracted in this state yet, the present exemplary embodiment extends the search range to a search range 4 (corresponding to the field 410 illustrated in FIG. 4B). In order to increase the accuracy of fitting by the polynomial approximation, it is useful to narrow the search range for searching for the extremal value. More specifically, the search range is narrowed in order to prevent otherwise possible degradation of the accuracy of data around the extremal value, which may occur due to data of pixel values distant from the extremal value. In the present exemplary embodiment, a method for updating the parameter of the search range different from the above-described can also be used. If the search range is previously shifted towards the direction in which the extremal value is likely to vary according to the temperature characteristic of the sensor, the time required for the search can be effectively reduced.

(b) Updating the Number of Dimensions for Fitting

If the extremal value has been determined inappropriate because the number of dimensions for fitting used in the polynomial approximation has been set inappropriate, then the present exemplary embodiment increases the number of dimensions for fitting. More specifically, in the examples illustrated in FIGS. 4A and 4B, the present exemplary embodiment executes the first search using the number of dimensions for fitting "2". If the least square method error value is equal to or higher than the fitting determination threshold 406, then the present exemplary embodiment increases the number of dimensions for fitting to "3". In order to reduce an effect on the fitting due to noise, it is useful to set the number of dimensions for fitting to be as small as possible. In the present exemplary embodiment, the fitting is executed with a small number of dimensions. Further, the present exemplary embodiment increases the number of dimensions only if the predetermined condition is satisfied. Accordingly, the present exemplary embodiment can implement the fitting that is least affected by noise.

(c) Updating of the Search Range and the Number of Dimensions for Fitting

As illustrated in FIG. 4C, the search range and the number of dimensions for fitting can be updated in combination. In the example illustrated in FIG. 4C, for an extremal value (1), the present exemplary embodiment executes the fitting by using the first search by using a search parameter 1. The number of dimensions for fitting of "2" is used in the fitting. If the extremal value position exists on the boundary between search ranges or outside the search range or if the least square method error value is equal to or higher than the fitting determination threshold, then the present exemplary embodiment updates the search parameter to a search parameter 2. According to the present exemplary embodiment, the fitting can be executed based on both the search range and the number of dimensions for fitting. Therefore, the present exemplary embodiment can implement the fitting with a very high accuracy. In the present exemplary embodiment, after having searched the detection position corresponding to the bright line spectrum by the first search method, the CPU 107, in step S304, determines whether to search the detection position corresponding to the bright line spectrum by the second search method according to a result of the determination as to whether the predetermined condition is satisfied. However, the present exemplary embodiment is not limited to this. For example, the extremal value can be calculated by the first and the second search methods without executing the determination in step S304. In other words, the present exemplary embodiment selects either one of the first detection position which has been acquired by the first search method, and the second detection position which has been acquired by the second search (identification) method. Further, the present exemplary embodiment associates the selected detection position with the wavelength. A predetermined evaluation function is used in the above-described selection. The evaluation function includes the following function: (1) an evaluation function for calculating the closeness to the median of the search range (2) ERRrms.

<Effect of the Present Exemplary Embodiment>

With the above-described configuration, the present exemplary embodiment can appropriately acquire the correspondence relation between the detection position and the wavelength even if the correspondence relation between the wavelength and the detection position has varied due to aging of the spectrometer or changes in the temperature inside the spectrometer. As a result, the present exemplary embodiment can accurately calibrate the spectrometer. In addition, in the present exemplary embodiment, the search range and the number of dimensions for fitting are previously stored as the parameters. Accordingly, the present exemplary embodiment is capable of executing the calibration at a high speed compared to the method for optimizing the search range and the number of dimensions every time a spectrometer is to be calibrated. In addition, in the present exemplary embodiment, the fitting is executed with the search range as narrow as possible. Therefore, the present exemplary embodiment can implement the fitting with a very high accuracy. Furthermore, in the present exemplary embodiment, the fitting is executed by using a polynomial with an order as low as possible. Accordingly, the present exemplary embodiment can implement the fitting least affected by noise.

Now, a second exemplary embodiment of the present invention will be described in detail below. In the present exemplary embodiment, dark data of the pixel value is acquired in a state in which the light source is not lit. The present exemplary embodiment analyzes the acquired dark data and acquires a state of the spectrometer according to a result of the analysis of the dark data. Then, the present exemplary embodiment changes the parameters (i.e., the search range and the number of dimensions for fitting) according to the state of the spectrometer, so that the extremal value with a high accuracy can be calculated. The configuration of the spectrometer according to the present exemplary embodiment can be the same as, or alternatively similar to, that of the first exemplary embodiment with reference to the block diagram of FIG. 1. Accordingly, the detailed description thereof will not be repeated here.

<Flow of Entire Processing>

The flow of the entire processing executed by using the spectrometer according to the present exemplary embodiment is similar to that described above in the first exemplary embodiment. The differences between the second and first embodiments are explained by the discussion provided below.

<Calibration>

Figure 7:
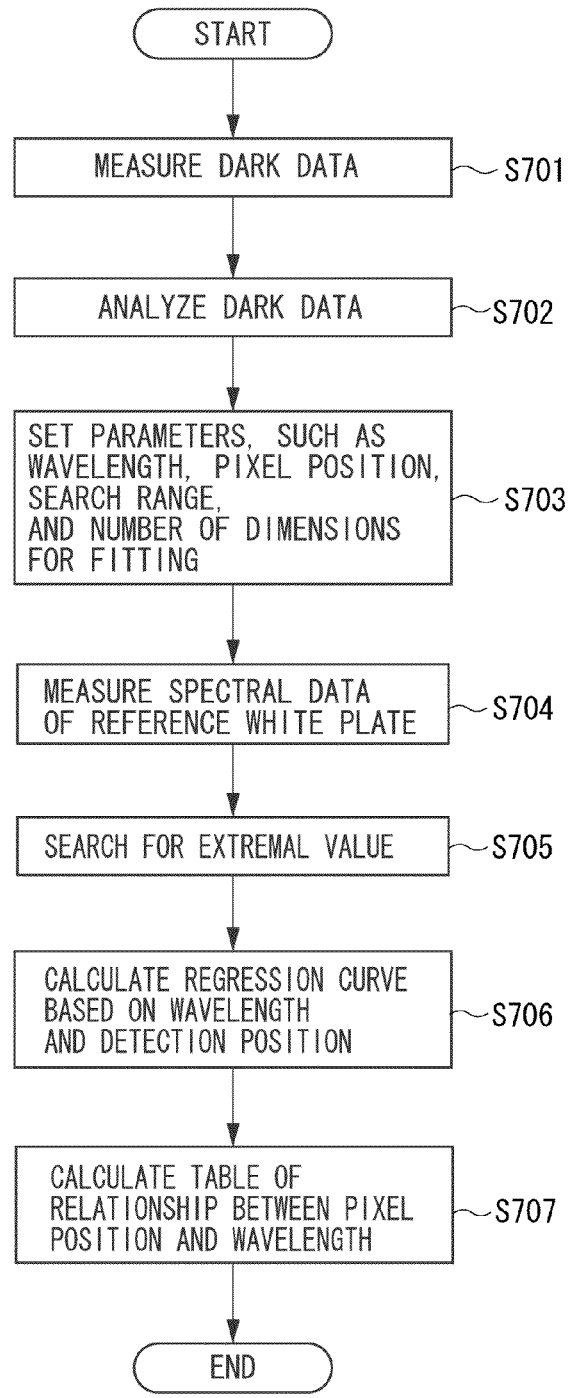
FIG. 7 is a flow chart illustrating an exemplary flow of calibration processing according to the second exemplary embodiment of the present invention.

Now, the calibration (step S202 illustrated in FIG. 2) according to the present exemplary embodiment, which is different from that in the first exemplary embodiment, will be described in detail below with reference to a flow chart in FIG. 7. Referring to FIG. 7, in step S701, the CPU 107 drives the light-receiving sensor controller 111 and acquires dark data. In step S702, the CPU 107 analyzes the dark data acquired in step S701. The processing in step S702 will be described in detail below. In step S703, the CPU 107 sets the parameter according to a result of the analysis in step S702. The processing for setting the parameter in step S703 will be described in detail below. In step S704, the CPU 107 drives the light source controller 110 and lights the light source 102. In addition, in step S704, the CPU 107 drives the light-receiving sensor controller 111 and measures the spectral data of the reference white plate 116. In step S705, the CPU 107 searches the spectral data of the reference white plate acquired in step S704 for an extremal value based on the parameter set in step S703 by executing the processing similar to that in step S303 in the first exemplary embodiment. In step S706, the CPU 107 generates a regression curve based on the correspondence relation between the extremal value acquired in step S705 and the corresponding wavelength. In step S707, the CPU 107 calculates an association table that stores the pixel position and the wavelength based on the regression curve calculated in step S706. Further, the CPU 107 stores the generated association table on the RAM 109.

<Analysis of Dark Data>

Figure 8:
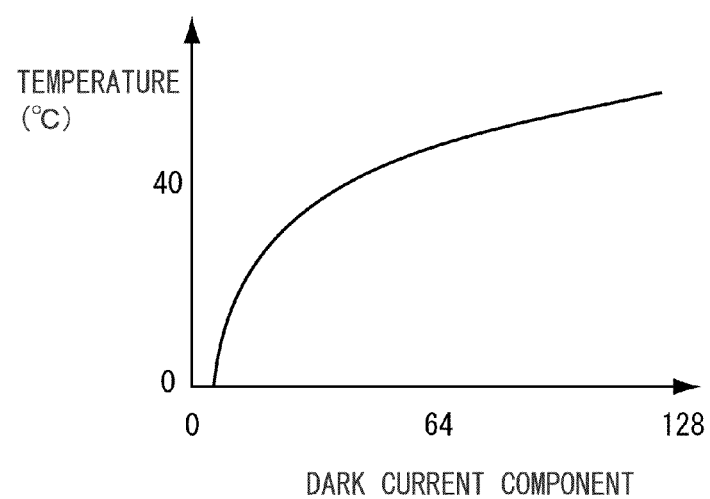
FIG. 8 illustrates an example of processing for analyzing dark data according to the second exemplary embodiment of the present invention.
Figure 10:
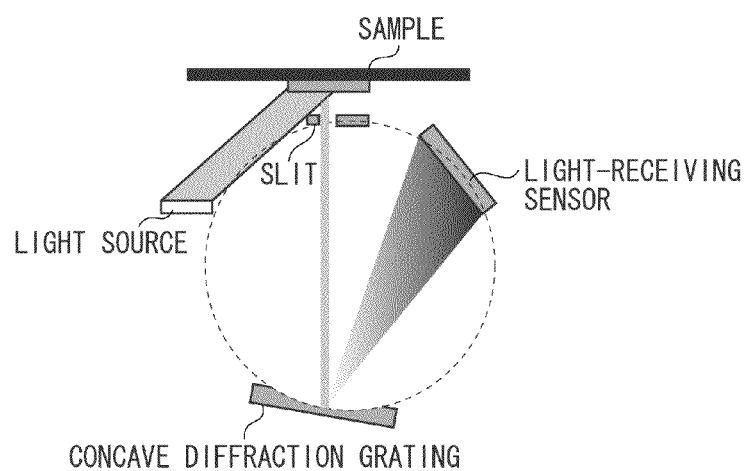
FIG. 10 illustrates an example of a Rowland spectrometer.

Now, the processing for analyzing dark data in step S702 will be described in further detail below. In the spectrometer 101 according to the present exemplary embodiment, variation of the spectrometer 101 itself may cause the correspondence relation between the wavelength and the detection position to vary, as one of the causes thereof. More specifically, the variation in the temperature may cause the body of the spectrometer 101 to expand or contract. As a result, the correspondence relation between the wavelength and the detection position can vary. FIG. 8 illustrates an example of a correspondence relation between an average output value of dark data (a dark current component) of the light-receiving sensor and the temperature. As illustrated in FIG. 8, the present exemplary embodiment acquires the temperature of the light-receiving sensor according to the average output value of dark data.

<Setting of Parameter>

FIG. 9 illustrates an example of the parameters set in step S703. In the present exemplary embodiment, the following parameters are necessary. The total number of search target extremal values (a field 901 in FIG. 9) The wavelength of the search target extremal values (fields 902 through 904 in FIG. 9) The search range and the number of dimensions for fitting corresponding to the sensor temperature (fields 905 through 909 in FIG. 9) In step S702, the CPU 107 sets the search range and the number of dimensions for fitting corresponding to the acquired light-receiving sensor temperature to the RAM 109.

<Combination with First Exemplary Embodiment>

The second exemplary embodiment can be implemented in combination with the first exemplary embodiment. In this case, the first search range is acquired by using the method according to the second exemplary embodiment. If the extremal value exists on the boundary between search ranges or outside the search range, or if the least square method error value is equal to or higher than the fitting determination threshold value, then the search range and the number of dimensions for fitting are updated by using the method according to the first exemplary embodiment.

<Effect of Second Exemplary Embodiment>

In the present exemplary embodiment, the search range for searching for the extremal value is shifted according to the temperature of the spectrometer. Accordingly, the present exemplary embodiment can calculate the correspondence relation between the wavelength and the pixel position with a high accuracy even if the temperature of the spectrometer has varied.

Aspects of the present invention can also be realized by a computer of a system or apparatus (or devices such as a CPU or a micro-processing unit (MPU)) that reads out and executes a program of computer executable instructions recorded on a memory device to perform the functions of the above-described embodiment(s), and by a method, the steps of which are performed by a computer of a system or apparatus by, for example, reading out and executing the program recorded on a memory device to perform the functions of the above-described embodiment(s). For this purpose, the program can be provided to the computer for example via a network or from a recording medium of various types serving as the memory device (e.g., computer-readable storage medium). Any of a wide variety of computer-readable storage media may be used. For example, the computer-readable storage medium may be any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

The above-described embodiments are examples of the present invention. The present invention can also be implemented in a wide variety of other manners. While the present invention has been described with reference to various exemplary embodiments, it is to be understood that the invention is not limited to the disclosed exemplary embodiments. The scope of the following claims is to be accorded the broadest interpretation so as to encompass, for example, all substantially equivalent modifications, structures and functions.

This application claims the benefit of Japanese Patent Application No. 2009-273888, filed Dec. 1, 2009, which is hereby incorporated by reference herein in its entirety.

What is claimed is:

1. A calibration apparatus configured to associate a pixel position and a wavelength of a sensor included in a spectrometer and to calibrate the spectrometer according to the associated pixel position and the wavelength, the calibration apparatus comprising:
a first search unit that searches, based on a pixel value corresponding to incident light acquired by the sensor of the spectrometer, for a first pixel position corresponding to a bright line spectrum of the incident light by a first search method;
a second search unit that searches, based on the pixel value corresponding to the incident light acquired by the sensor of the spectrometer, for a second pixel position corresponding to the bright line spectrum of the incident light by a second search method; and
an association unit that associates either one of the first pixel position extracted by the first search unit and the second pixel position extracted by the second search unit with the wavelength of the bright line spectrum of the incident light;
wherein in the first search method, the first pixel position corresponding to the bright line spectrum of the incident light is searched for within a first search range of the sensor, and
wherein it is determined whether a predetermined condition is satisfied based on whether the first pixel position exists on a boundary of the first search range or outside the first search range.

2. The calibration apparatus according to claim 1, wherein the second search unit searches, responsive to the predetermined condition being satisfied, for the second pixel position corresponding to the bright line spectrum of the incident light by the second search method based on the pixel value corresponding to the incident light acquired by the sensor of the spectrometer.

3. The calibration apparatus according to claim 1,
wherein in the first search method, the first pixel position corresponding to the bright line spectrum of the incident light is searched for within a first search range of the sensor, and
wherein in the second search method, the second pixel position corresponding to the bright line spectrum of the incident light is searched for within a second search range of the sensor.

4. The calibration apparatus according to claim 1,
wherein in the first search method, the first pixel position corresponding to the bright line spectrum of the incident light is searched for by approximating a first function for the pixel value of the incident light, and
wherein in the second search method, the second pixel position corresponding to the bright line spectrum of the incident light is searched for by approximating a second function for the pixel value of the incident light.

5. The calibration apparatus according to claim 3,
wherein in the first search method, the first pixel position corresponding to the bright line spectrum of the incident light is searched based on extremal value of a distribution of pixel values of the incident light, and
wherein in the second search method, the second pixel position corresponding to the bright line spectrum of the incident light is searched based on an extremal value of a distribution of pixel values of the incident light.

6. The calibration apparatus according to claim 5, wherein the extremal value is calculated by a least square method that uses an n-th order polynomial.

7. The calibration apparatus according to claim 2,
wherein in the first search method, the first pixel position corresponding to the bright line spectrum of the incident light is searched for by approximating a first function for the pixel value of the incident light, and
wherein it is determined whether the predetermined condition is satisfied based on whether an error value between the approximated first function and the pixel value exceeds a predetermined value.

8. The calibration apparatus according to claim 2, wherein the predetermined condition is set based on a temperature of the sensor.

9. The calibration apparatus according to claim 8, wherein the temperature of the sensor is acquired based on a pixel value measurement taken without emitting light from a light source.

10. The calibration apparatus according to claim 9, further comprising a regression curve generation unit that calculates a regression curve based on a correspondence relation between a plurality of pixel positions and a wavelength mutually associated by the association unit.

11. A spectrometer comprising:
the calibration apparatus according to claim 1; and
the sensor.

12. A method for calibrating a sensor included in a spectrometer by associating a pixel position and a wavelength of the sensor, the method comprising:
searching, based on a pixel value corresponding to incident light acquired by the sensor of the spectrometer, for a first pixel position corresponding to a bright line spectrum of the incident light by a first search method;
searching, based on a pixel value corresponding to the incident light acquired by the sensor of the spectrometer, for a second pixel position corresponding to a bright line spectrum of the incident light by a second search method; and
associating either one of the first pixel position and the second pixel position with the wavelength of the bright line spectrum of the incident light;
wherein in the first search method, the first pixel position corresponding to the bright line spectrum of the incident light is searched for within a first search range of the sensor, and
wherein it is determined whether a predetermined condition is satisfied based on whether the first pixel position exists on a boundary of the first search range or outside the first search range.

13. A non-transitory computer-readable storage medium storing a program of instructions which, when executed by a computer, cause the computer to perform the method of claim 12.

14. A calibration apparatus configured to associate a pixel position and a wavelength of a sensor included in a spectrometer and to calibrate the spectrometer according to the associated pixel position and the wavelength, the calibration apparatus comprising:
- a first search unit that searches, based on a pixel value corresponding to incident light acquired by the sensor of the spectrometer, for a first pixel position corresponding to a bright line spectrum of the incident light by approximating a first polynomial approximation with a first number of dimensions for the pixel value of the incident light;
- a second search unit that searches, based on the pixel value corresponding to the incident light acquired by the sensor of the spectrometer, for a second pixel position corresponding to the bright line spectrum of the incident light by approximating a second asymmetrical shape polynomial approximation with a second number of dimensions for the pixel value of the incident light wherein the second number of dimensions does not equal the first number of dimensions; and
- an association unit that associates either one of the first pixel position extracted by the first search unit and the second pixel position extracted by the second search unit with the wavelength of the bright line spectrum of the incident light.

15. A method for calibrating a sensor included in a spectrometer by associating a pixel position and a wavelength of the sensor, the method comprising:
- searching, based on a pixel value corresponding to incident light acquired by the sensor of the spectrometer, for a first pixel position corresponding to a bright line spectrum of the incident light by approximating a first polynomial approximation with a first number of dimensions for the pixel value of the incident light;
- searching, based on a pixel value corresponding to the incident light acquired by the sensor of the spectrometer, for a second pixel position corresponding to a bright line spectrum of the incident light by approximating a second asymmetrical shape polynomial approximation with a second number of dimensions for the pixel value of the incident light wherein the second number of dimensions does not equal the first number of dimensions; and
- associating either one of the first pixel position and the second pixel position with the wavelength of the bright line spectrum of the incident light.

* * * * *